(12) United States Patent
Lee et al.

(10) Patent No.: US 10,141,115 B2
(45) Date of Patent: Nov. 27, 2018

(54) THIN FILM CAPACITOR INCLUDING ALTERNATIVELY DISPOSED DIELECTRIC LAYERS HAVING DIFFERENT THICKNESSES

(71) Applicant: SAMSUNG ELECTRO-MECHANICS CO., LTD., Suwon-si, Gyeonggi-do (KR)

(72) Inventors: Kyo Yeol Lee, Suwon-si (KR); Yun Sung Kang, Suwon-si (KR); Hai Joon Lee, Suwon-si (KR); Dong Joon Oh, Suwon-si (KR); Ho Phil Jung, Suwon-si (KR); Seung Mo Lim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/463,652

(22) Filed: Mar. 20, 2017

(65) Prior Publication Data

US 2018/0068798 A1    Mar. 8, 2018

(30) Foreign Application Priority Data

Sep. 6, 2016    (KR) .................. 10-2016-0114639

(51) Int. Cl.
*H01G 4/33* (2006.01)
*H01G 4/012* (2006.01)
*H01G 4/12* (2006.01)

(52) U.S. Cl.
CPC ............... *H01G 4/33* (2013.01); *H01G 4/012* (2013.01); *H01G 4/1227* (2013.01); *H01G 4/1245* (2013.01)

(58) Field of Classification Search
CPC ........ H01G 4/33; H01G 4/1227; H01G 4/012; H01G 4/1245
See application file for complete search history.

(56) References Cited

U.S. PATENT DOCUMENTS

| | | | | |
|---|---|---|---|---|
| 3,278,816 | A * | 10/1966 | Gaenge ................... | H01G 4/01 361/273 |
| 2003/0170432 | A1 * | 9/2003 | Kobayashi .............. | H01G 4/30 428/209 |
| 2008/0233762 | A1 | 9/2008 | Hong | |
| 2008/0258191 | A1 | 10/2008 | Baniecki et al. | |
| 2010/0246092 | A1 * | 9/2010 | Shibue ................... | H01G 4/232 361/313 |

(Continued)

FOREIGN PATENT DOCUMENTS

| | | |
|---|---|---|
| JP | 2007-123683 A | 5/2007 |
| JP | 2007258566 A * | 10/2007 |
| JP | 2008-227153 A | 9/2008 |

(Continued)

*Primary Examiner* — David M Sinclair
(74) *Attorney, Agent, or Firm* — McDermott Will & Emery LLP

(57) ABSTRACT

A thin film capacitor includes a body having first and second electrode layers and first and second dielectric layers alternately stacked on a substrate. A thickness of the first dielectric layer is 1.2 to 3 times that of the second dielectric layer. Therefore, leakage current characteristics of the dielectric layers may be improved, and capacitance of the thin film capacitor may be secured.

14 Claims, 6 Drawing Sheets

(56) References Cited

U.S. PATENT DOCUMENTS

2014/0367757 A1* 12/2014 Jakushokas ............ H01L 28/60
　　　　　　　　　　　　　　　　　　　　　257/306
2017/0365656 A1* 12/2017 Zelner .................... H01L 28/40

FOREIGN PATENT DOCUMENTS

| JP | 4382103 | B2 | 12/2009 |
| JP | 2010-232445 | A | 10/2010 |
| KR | 10-0805018 | B1 | 2/2008 |

* cited by examiner

THIN FILM CAPACITOR INCLUDING ALTERNATIVELY DISPOSED DIELECTRIC LAYERS HAVING DIFFERENT THICKNESSES

CROSS-REFERENCE TO RELATED APPLICATION(S)

This application claims benefit of priority to Korean Patent Application No. 10-2016-0114639, filed on Sep. 6, 2016 in the Korean Intellectual Property Office, the disclosure of which is incorporated herein by reference in its entirety.

TECHNICAL FIELD

The present disclosure relates to a thin film capacitor.

BACKGROUND

Recently, in accordance with the trend toward thinness of an application processor (AP) of a smartphone, the necessity for a thin film capacitor having a thickness thinner than that of a multilayer ceramic capacitor (MLCC) has increased.

In general, in order to increase capacitance of a capacitor, first and second electrode layers and dielectric layers are manufactured as a multilayer structure, and the dielectric layers are connected to each other in parallel. In a thin film capacitor having a multilayer structure in which the dielectric layers are connected to each other in parallel, directions of electric fields applied to the respective dielectric layers oppose to each other, such that leakage current characteristics may be lowered.

In detail, in the dielectric layers formed on the electrode layers, pyrochlore phases, which are defects that may occur in a thin film process, are present in regions of the dielectric layers adjacent to the electrode layers. The pyrochlore phases may cause a defect of a negative (−) polarity (a negative (−) charge defect) in lower portions of the dielectric layers, such that a bias polarity phenomenon occurs, depending on directions of electrodes to which voltages are applied. That is, current leakage characteristics are changed, depending on directions in which the voltages are applied, and in a case of the thin film capacitor having the multilayer structure in which the dielectric layers are connected to each other in parallel, the leakage current characteristics may be lowered.

Therefore, a method of securing the leakage current characteristics of the dielectric layers is required.

SUMMARY

An aspect of the present disclosure may provide a thin film capacitor in which leakage current characteristics of dielectric layers may be improved and of which capacitance may be secured.

According to an aspect of the present disclosure, a thin film capacitor may include: a body having first and second electrode layers and first and second dielectric layers alternately stacked on a substrate. A thickness of the first dielectric layer is 1.2 to 3 times that of the second dielectric layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, a thin film capacitor according to an exemplary embodiment in the present disclosure will be described.

Figure 1:
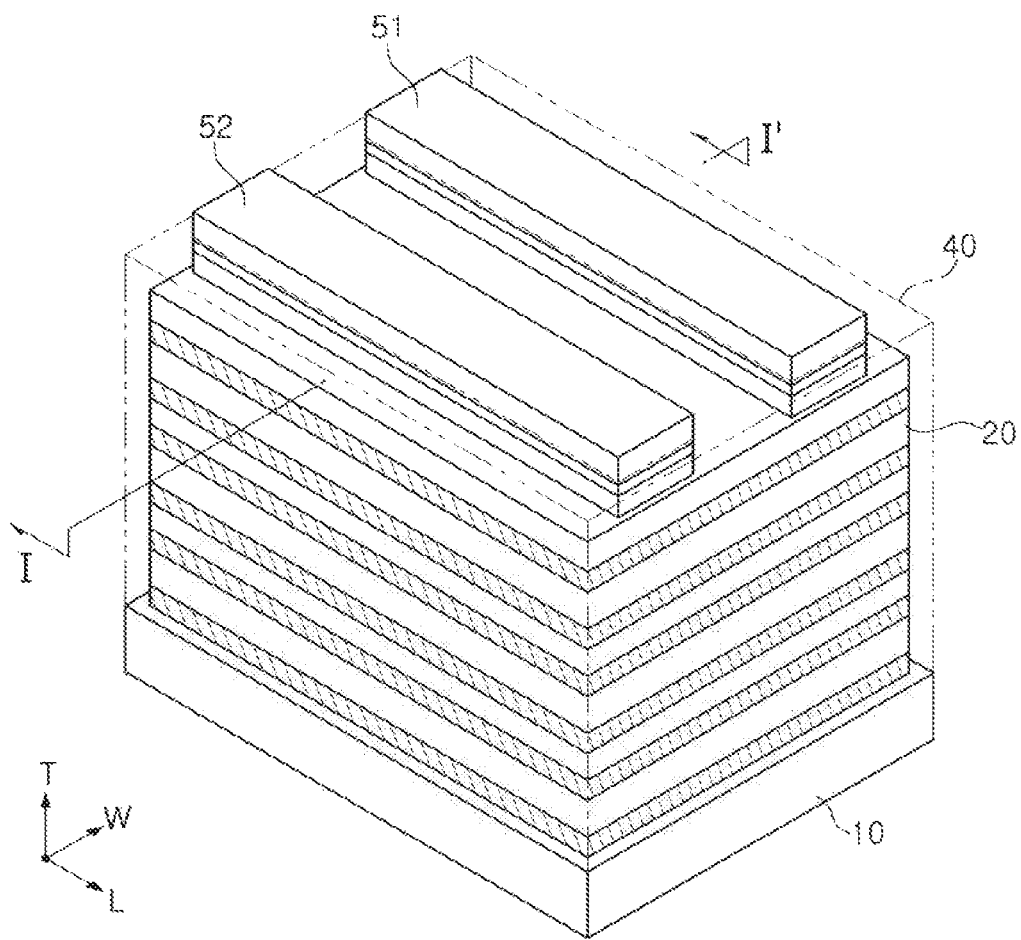
FIG. 1 is a schematic perspective view illustrating a thin film capacitor according to an exemplary embodiment in the present disclosure.
Figure 2:
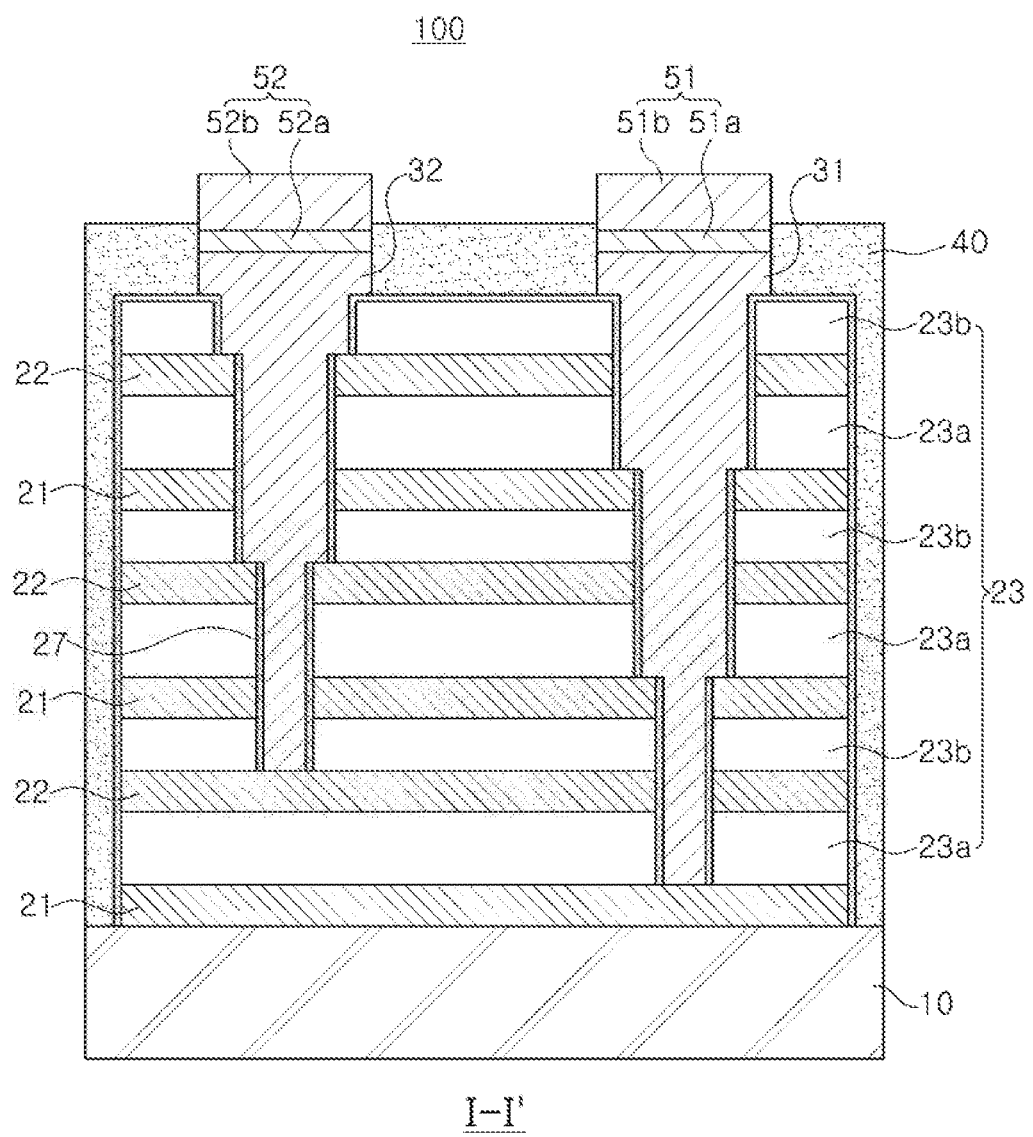
FIG. 2 is a schematic cross-sectional view of the thin film capacitor according to an exemplary embodiment in the present disclosure, taken along line I-I' of FIG. 1.

FIG. 1 is a schematic perspective view illustrating a thin film capacitor according to an exemplary embodiment in the present disclosure, and FIG. 2 is a schematic cross-sectional view of the thin film capacitor according to an exemplary embodiment in the present disclosure, taken along line I-I' of FIG. 1.

Referring to FIGS. 1 and 2, a thin film capacitor 100 according to an exemplary embodiment in the present disclosure may include a body 20 having first and second electrode layers 21 and 22 and first and second dielectric layers 23a and 23b alternately stacked on a substrate 10. A thickness of the first dielectric layer 23a may be 1.2 to 3 times that of the second dielectric layer 23b.

The substrate 10 may be insulated from the first electrode layer 21, and may be formed of one selected from the group consisting of $Al_2O_3$, $SiO_2/Si$, MgO, $LaAlO_3$, and $SrTiO_3$, but is not limited thereto. The substrate 10 may have sufficient flatness and surface roughness.

The body 20 may have a stacked structure in which the first electrode layer 21 is formed on the substrate 10, the first dielectric layer 23a is formed on the first electrode layer 21, the second electrode layer 22 is formed on the first dielectric layer 23a, and the second dielectric layer 23b is formed on the second electrode layer 22, and may have a form in which a plurality of first electrode layers 21 and second electrode layers 22 are alternately stacked with one of the first and second dielectric layers 23 interposed therebetween. However, the number of stacked layers is not limited to that illustrated in the drawings.

As the numbers of first and second electrode layers 21 and 22 and first and second dielectric layers 23 are increased, equivalent series resistance (ESR) of the thin film capacitor may be reduced.

The first and second electrode layers 21 and 22 may be layers that do not have predetermined patterns.

The first and second electrode layers 21 and 22 may be formed of a conductive material.

The conductive material may be copper (Cu), aluminum (Al), gold (Au), silver (Ag), platinum (Pt), iridium (Ir), ruthenium (Ru), $IrO_2$, $RuO_2$, or the like, but is not limited thereto.

The first and second electrode layers 21 and 22 may be formed by a vapor phase synthesis method such as a sputtering method, a vapor deposition method, or the like, and may be processed by a photolithography process and a dry etching process.

High temperature heat history may be generated in a process of forming a dielectric layer, which is a thin film having a high dielectric constant. As a result, an internal electrode is diffused to the dielectric layer or reacts to the dielectric layer, such that a leakage current may be increased in a capacitor.

The first and second electrode layers 21 and 22 may be formed of platinum (Pt), which is a high melting point material, such that diffusion of the first and second electrode layers 21 and 22 to the dielectric layers 23 or reaction of the first and second electrode layers 21 and 22 to the dielectric layers 23 may be suppressed.

The dielectric layers 23 may include a perovskite material, which is a material having a high dielectric constant.

The perovskite material may be a dielectric material of which a dielectric constant may be significantly changed, for example, one selected from the group consisting of a barium titanate (BT) ($BaTiO_3$)-based material, a strontium titanate (ST) ($SrTiO_3$)-based material, a barium strontium titanate (BST) ($BaSrTiO_3$)-based material, a PZT ($PbZrTiO_3$)-based material, or the like, but is not limited thereto.

The dielectric layer may be formed by a sol-gel method, a sputter deposition method, a metal organic chemical vapor deposition (MOCVD) method, a plasma enhanced chemical vapor deposition (PECVD) method, a laser ablation method, or the like.

Surface treatment may be performed on the first and second electrode layers 21 and 22 or the dielectric layers 23.

The surface treatment, which is a process of planarizing a surface, may be performed by etching and polishing, and may be, for example, a dry etching method such as an ion beam etching method or a chemical mechanical polishing (CMP) method, but is not limited thereto.

In general, when the thin film capacitor is formed in a multilayer structure, leakage current characteristics may be lowered. In detail, in the dielectric layers formed on the electrode layers, a defect of a negative (−) polarity (a negative (−) charge defect) is formed in lower portions of the dielectric layers due to pyrochlore phases present in regions of the dielectric layers adjacent to the electrode layers, such that a bias polarity phenomenon occurs, depending on directions of electrodes to which voltages are applied.

Figure 5A:
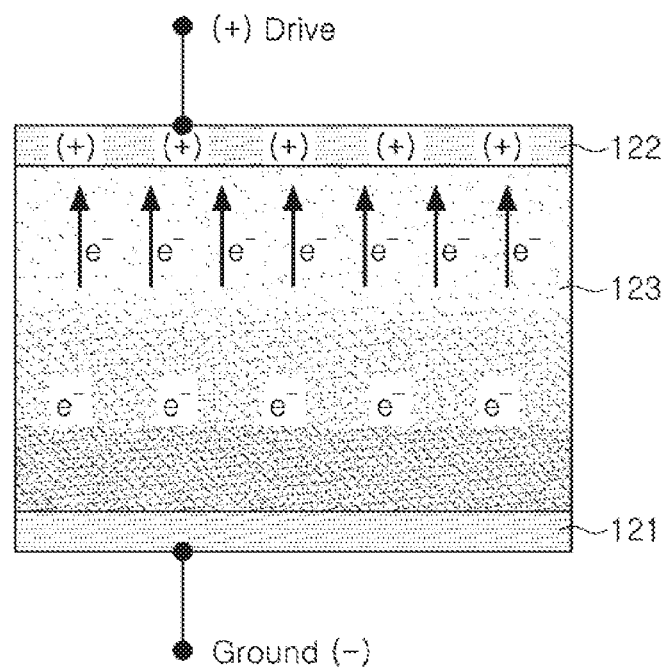
FIGS. 5A and 5B are schematic views illustrating current flows depending on directions in which a current is applied to two immediately adjacent electrode layers of a thin film capacitor.
Figure 5B:
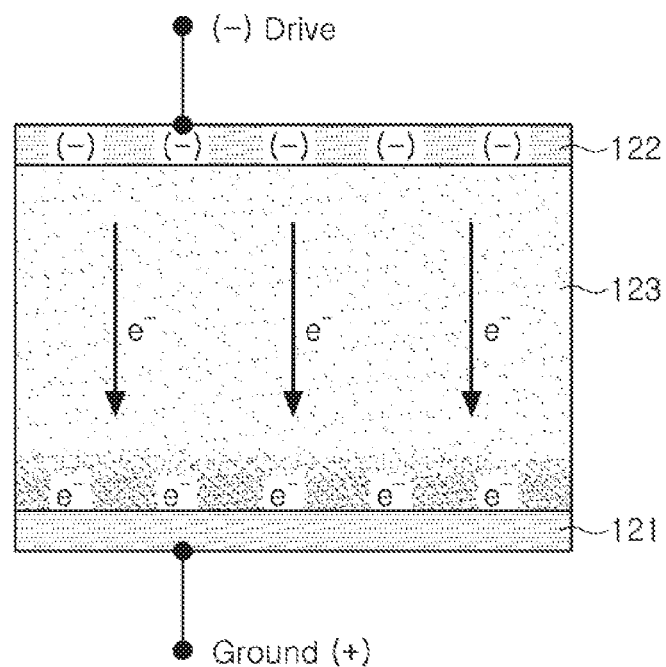
Figure 6:
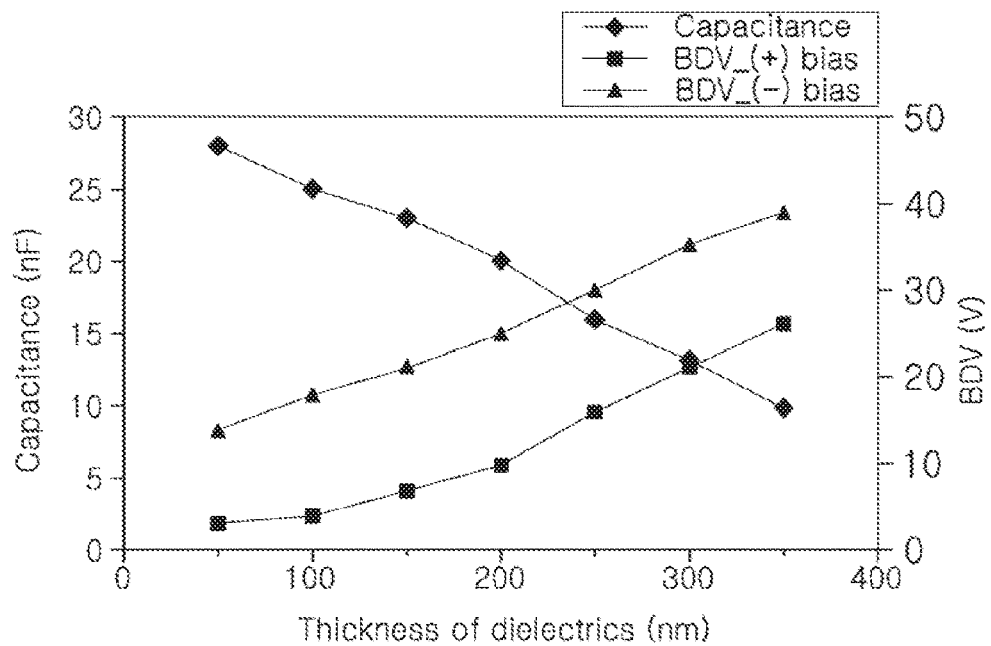
FIG. 6 is a graph illustrating capacitance depending on a thickness of one dielectric layer between the two immediately adjacent electrode layers and leakage current characteristics depending on directions in which currents are applied.

FIGS. 5A and 5B are schematic views illustrating current flows depending on directions in which currents are applied to two immediately adjacent electrode layers of a thin film capacitor, and FIG. 6 is graphs illustrating capacitance depending on a thickness of one dielectric layer between the two immediately adjacent electrode layers and leakage current characteristics depending on directions in which currents are applied.

FIGS. 5A through 6 illustrate that leakage current characteristics are changed depending on directions in which voltages are applied. Since a thin film capacitor having a multilayer structure has a structure in which electrode layers 121 and 122 having different polarities are alternately stacked, voltages are also applied to the electrode layers 121 and 122 in alternate directions. Therefore, when dielectric layers 123 disposed on the electrode layers having the different polarities are connected to each other in parallel, leakage current characteristics may be lowered. As a method of improving the leakage current characteristics described above, there is a method of increasing thicknesses of the dielectric layers. However, when the thicknesses of the dielectric layers are increased, capacitance is not secured.

Figure 3:
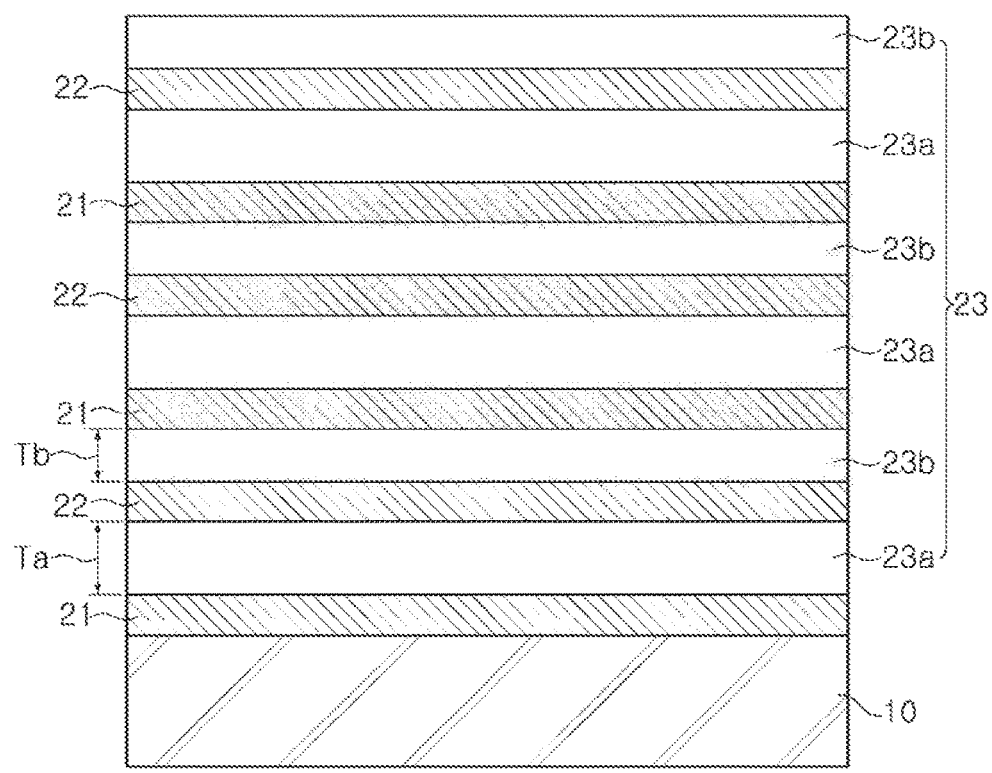
FIGS. 3 and 4 are schematic front views illustrating a body of the thin film capacitor of FIG. 1.
Figure 4:
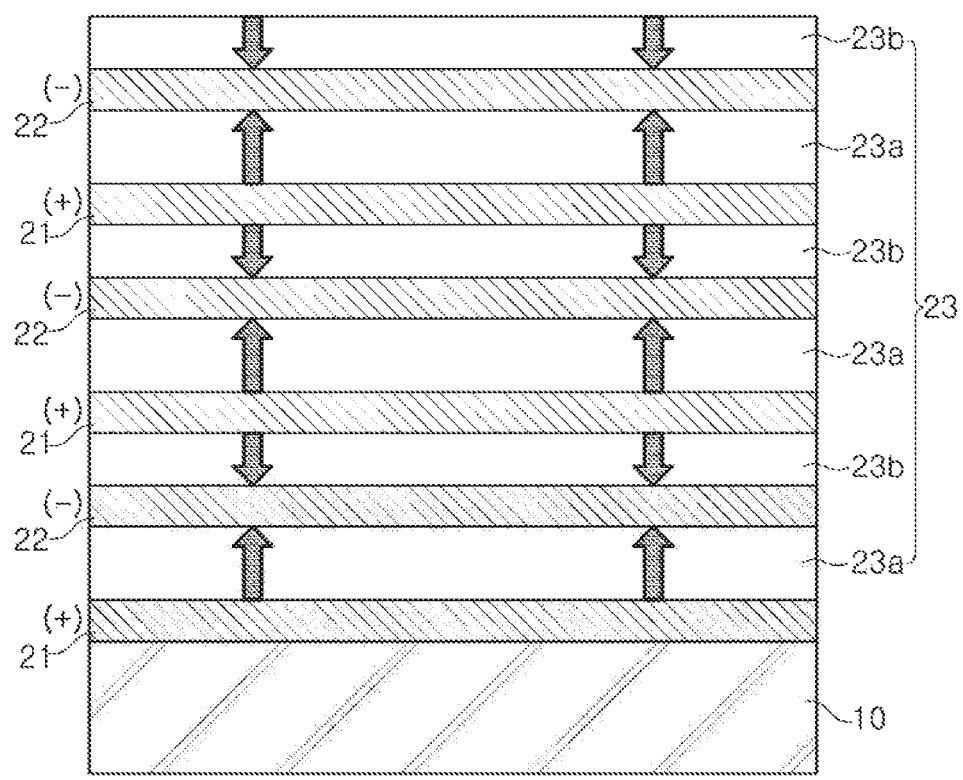

FIGS. 3 and 4 are schematic front views illustrating a body of the thin film capacitor of FIG. 1.

Referring to FIG. 3, in an exemplary embodiment in the present disclosure unlike the related art, the body may have the first and second electrode layers 21 and 22 and the dielectric layers 23 are alternately stacked therein, the dielectric layers 23 may include the first dielectric layers 23a disposed on the first electrode layers 21 and the second dielectric layers 23b disposed on the second electrode layers 22, and the thickness Ta of the first dielectric layer 23a may be 1.2 to 3 times the thickness Tb of the second dielectric layer 23b.

When the thickness Ta of the first dielectric layer 23a is 1.2 to 3 times the thickness Tb of the second dielectric layer 23b, leakage current characteristics of the thin film capacitor may be improved, and a decrease in capacitance may be significantly suppressed even in a capacitor having the same number of layers. In addition, due to the improvement of the leakage current characteristics, a capacitor capable of enduring a high voltage region may be implemented.

The thickness Tb of the second dielectric layer 23b may be 30 nm to 300 nm, and the thickness of the first dielectric layer 23a Ta may be greater than that of the second dielectric layer.

The first and second dielectric layers 23a and 23b may be formed of the same materials, as described above, and may include perovskite phases, and in the first dielectric layer 23a formed on the first electrode layer 21 and the second dielectric layer 23b formed on the second electrode layer 22, regions adjacent to interfaces on which the first and second dielectric layers 23a and 23b are in contact with the first and second electrode layers 21 and 22 may include pyrochlore phases.

The perovskite phase may secure dielectric characteristics of the dielectric layer, and the pyrochlore phase may act as a defect to reduce the dielectric characteristics of the dielectric layer.

Therefore, as a ratio of the perovskite phase in the dielectric layer becomes high, the dielectric characteristics of the dielectric layer may be increased. In addition, as a thickness of the dielectric layer becomes thick, crystallinity of the perovskite phase is improved, such that the dielectric characteristics and the leakage current characteristics may be further improved. However, as the thickness of the dielectric layer becomes thick, capacitance of the capacitor may be reduced.

In the present disclosure, the first and second dielectric layers having different thicknesses may be alternately stacked to increase the dielectric characteristics, such that the leakage current characteristics of the thin film capacitor may be improved and the capacitance of the thin film capacitor may be secured.

Sequences in which the first and second dielectric layers are stacked may be changed depending on directions in which voltages are applied to the thin film capacitor. For example, in a case in which a positive (+) voltage is applied to the first electrode layer, the first dielectric layer may have a thickness greater than that of the second dielectric layer, and the first electrode layer, the first dielectric layer, the second electrode layer, and the second dielectric layer may be sequentially stacked in the body.

In FIG. 4, currents and movement of electrons in the first and second dielectric layers in a case in which a positive (+) voltage is applied to the first electrode layers 21 and a negative (−) voltage is applied to the second electrode layers 22 are represented by arrows.

In a case according to the related art in which thicknesses of the first and second dielectric layers are the same as each other, due to a direction of a current having a negative influence on leakage current characteristics, leakage current characteristics of an entire capacitor may be lowered, a value of a breakdown voltage (BDV) may be lowered, such that it is difficult to implement a capacitor capable of enduring a high voltage.

In the present disclosure, due to a direction of a current of the first dielectric layers to which the positive (+) voltage is applied, the direction of the current having the negative influence on the leakage current characteristics may be offset, such that the leakage current characteristics may be increased. In addition, a value of a breakdown voltage may be higher than that of the related art, such that the capacitor capable of enduring the high voltage may be implemented.

Table 1 represents capacitance and breakdown voltages depending on a ratio of a thickness of a first dielectric layer to that of a second dielectric layer. Sizes and materials of the respective samples are the same as each other, and only thicknesses of first and second dielectric layers of the respective samples are different from each other.

TABLE 1

| Sample No. | Thickness of First Dielectric Layer/Thickness of Second Dielectric Layer (nm/nm) | Capacitance [nF] | BDV(+) [V] | BDV(−) [V] |
|---|---|---|---|---|
| 1* | 1.0 (150/150) | 138 | 7 | 21 |
| 2* | 1.1 (165/150) | 114 | 8 | 21 |
| 3 | 1.2 (180/150) | 108 | 10 | 21 |
| 4 | 1.5 (225/150) | 100 | 13 | 21 |
| 5 | 2.0 (300/150) | 84 | 21 | 21 |
| 6 | 3.0 (450/150) | 75 | 21 | 21 |
| 7* | 3.2 (480/150) | 68 | 21 | 21 |

*Comparative Example

Figure 7:
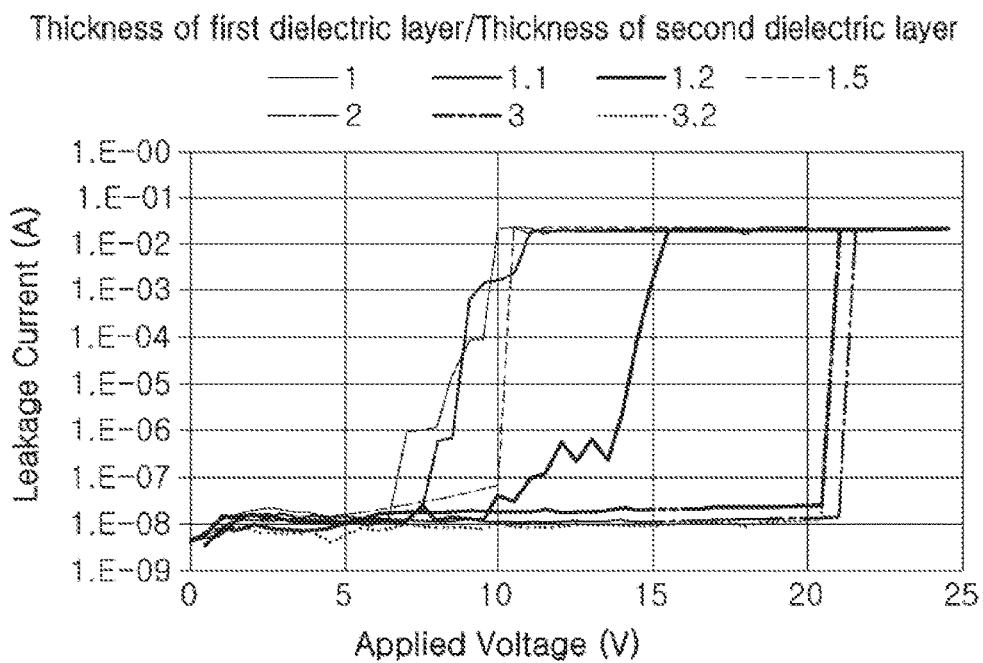
FIG. 7 is a graph illustrating leakage current characteristics, depending on a ratio of a thickness of a first dielectric layer to that of a second dielectric layer a thin film capacitor.

FIG. 7 is a graph illustrating leakage current characteristics, depending on a multiple of a thickness of a first dielectric layer to that of a second dielectric layer.

Referring to Table 1 and FIG. 7, it may be appreciated that when a thickness of a first dielectric layer is 1.2 to 3 times that of a second dielectric layer, a capacitor capable of securing capacitance and enduring a high voltage through improvement of leakage current characteristics is implemented.

On the other hand, it may be appreciated that when the thickness of the first dielectric layer is less than 1.2 times that of the second dielectric layer, capacitance may be secured, but leakage current characteristics are not improved, and it may be appreciated that when the thickness of the first dielectric layer exceeds 3.0 times that of the second dielectric layer, capacitance is rapidly reduced, such that capacitance that is intended to be implemented is not secured.

In the present disclosure, the first and second polarities refer to different polarities.

Referring to FIG. 2, first vias 31 may be electrically connected to the first electrode layers 21 and may penetrate from one surface of the body up to a lowest first electrode layer 21 adjacent to the substrate 10, second vias 32 may be electrically connected to the second electrode layers 22 and may penetrate from one surface of the body up to a lowest second electrode layer 22 adjacent to the substrate 10. The first vias 31 and the second vias 32 may be electrically insulated from each other.

The first and second vias 31 and 32 may be alternately disposed in one direction, and may be alternately disposed on the same line or in a zigzag shape in one direction.

When the first vias and the second vias become close to each other, currents may be generated in directions in which magnetic inductions are offset against each other, such that the magnetic inductions may be suppressed, and current paths may become short, such that resistance is reduced, which is effective in reducing ESR of the thin film capacitor.

The first and second vias 31 and 32 may be formed by forming a plurality of first and second via holes in the body in a stacked direction of the body and filling a conductive material in the first and second via holes.

A method of filling the conductive material in the first and second via holes may be performed by plating. The first and second via holes may be formed by a laser punching method or a mechanical punching method, but are not limited thereto.

The conductive material may be copper (Cu), aluminum (Al), gold (Au), silver (Ag), platinum (Pt), or the like, but is not limited thereto.

When the first and second vias are formed in the plural, contact surfaces of the first and second vias contacting the first and second electrode layers, respectively, may be increased to reduce ESR of the thin film capacitor.

First and second external electrodes (not illustrated) may connect the first and second vias and first and second electrode pads to each other, respectively.

The first and second external electrodes may be formed of a conductive material, and may be formed by a plating process.

The conductive material may be copper (Cu), aluminum (Al), gold (Au), silver (Ag), platinum (Pt), or the like, but is not limited thereto.

The first and second electrode pads 51 and 52 may be formed on the first and second external electrodes, respectively, and may include a conductive material such as copper (Cu), aluminum (Al), gold (Au), silver (Ag), platinum (Pt), or the like.

The first and second electrode pads 51 and 52 may include a conductive material.

The conductive material may be copper (Cu), aluminum (Al), gold (Au), silver (Ag), platinum (Pt), or the like, but is not limited thereto.

The first and second electrode pads 51 and 52 may include seed layers 51a and 52a and electrode layers 51b and 52b on the seed layers 51a and 52a, respectively.

The first and second electrode pads 51 and 52 may be disposed at positions that do not overlap the first and second vias, respectively, in a direction in which the dielectric layers and the electrode layers are stacked.

The first and second electrode pads 51 and 52 may be integrated with first and second connection electrodes, respectively, or may be disposed on the first and second connection electrodes, respectively.

The first and second electrode pads may be integrated with the first and second external electrodes, respectively, but are not limited thereto.

Insulating layers 27 may be formed in order for the first vias 31 and the second vias 32 to be electrically connected to the first electrode layers 21 and the second electrode layers 22, respectively.

The insulating layers 27 may be formed between the first vias 31, the dielectric layers 23, and the second electrode layers 22, and may be formed between the second vias 32, the dielectric layers 23, and the first electrode layer 21.

That is, the insulating layers 27 may secure insulation between the first vias 31 and the second electrode layers 22 and insulation between the second vias 32 and the first electrode layers 21, and may be formed on surfaces of the dielectric layers to reduce parasitic capacitance generated in the dielectric layers.

The insulating layer 27 may be formed of an organic material such as benzocyclobutene (BCB), polyimide, or the like, or an inorganic material such as $SiO_2$, $Si_3N_4$, or the like, and may be formed of a material having a dielectric constant smaller than that of the dielectric layer in order to increase an insulating property and reduce parasitic capacitance.

The insulating layer may be formed by a chemical vapor deposition (CVD) method that may form a layer at a uniform thickness in a three-dimensionally complicated shape.

A protection layer 40 may be formed in order to prevent the body and the first and second external electrodes from being deteriorated or polluted due to humidity from an external source and a chemical reaction to oxygen from an external source and prevent the body and the first and second connection electrodes from being damaged at the time of mounting the thin film capacitor on a board.

The protection layer 40 may be formed of a material having high heat resistance, for example, an organic thermosetting material or photo-curable material such as polyimide.

The protection layer may be formed by exposure and development processes of a photo-resist, a spray applying process, a dipping method using a low-viscosity polymer coating solution, but is not limited thereto.

As set forth above, according to the exemplary embodiment in the present disclosure, the leakage current characteristics of the dielectric layers may be improved, and the capacitance of the thin film capacitor may be secured.

While exemplary embodiments have been shown and described above, it will be apparent to those skilled in the art that modifications and variations could be made without departing from the scope of the present invention, as defined by the appended claims.

What is claimed is:

1. A thin film capacitor comprising:
   a body having first and second electrode layers and first and second dielectric layers alternately stacked on a substrate, each of the number of the first dielectric layers, the number of the second dielectric layers, the number of the first electrode layers, and the number of the second electrode layers being two or greater; and
   first and second vias electrically connected to the first and second electrode layers, respectively,
   wherein a thickness of the first dielectric layer is 1.2 to 3 times that of the second dielectric layer.

2. The thin film capacitor of claim 1, wherein the thickness of the second dielectric layer is 30 nm to 300 nm.

3. The thin film capacitor of claim 1, wherein in the first dielectric layer formed on the first electrode layer and the second dielectric layer formed on the second electrode layer, regions adjacent to interfaces on which the first and second dielectric layers are in contact with the first and second electrode layers include pyrochlore phases.

4. The thin film capacitor of claim 1, wherein the first and second dielectric layers include perovskite phases.

5. The thin film capacitor of claim 1, wherein the first and second dielectric layers are formed of one selected from the group consisting of a barium titanate (BT) ($BaTiO_3$)-based material, a strontium titanate (ST) ($SrTiO_3$)-based material, a barium strontium titanate (BST) ($BaSrTiO_3$)-based material, and a PZT ($PbZrTiO_3$)-based material.

6. The thin film capacitor of claim 1, further comprising first and second electrode pads electrically connected to the first and second vias, respectively.

7. The thin film capacitor of claim 1, further comprising a protection layer covering the body.

8. A thin film capacitor comprising:
   a body including a plurality of dielectric layers and first and second electrode layers alternatively stacked on a substrate,
   wherein the dielectric layers include two or more first dielectric layers each directly disposed on one of the first electrode layers and two or more second dielectric layers each directly disposed on one of the second electrode layers,
   a thickness of the first dielectric layer is 1.2 to 3 times that of the second dielectric layer, and
   the thickness of the second dielectric layer is 30 nm to 300 nm.

9. The thin film capacitor of claim 8, wherein, in the first and second dielectric layers, regions adjacent to an interface on which the first dielectric layers are in contact with the first electrode layers and an interface on which the second dielectric layers are in contact with the second electrode layers include pyrochlore phases.

10. The thin film capacitor of claim 8, wherein the dielectric layers include perovskite phases.

11. The thin film capacitor of claim 8, wherein the dielectric layers are formed of one selected from the group consisting of a barium titanate (BT) ($BaTiO_3$)-based material, a strontium titanate (ST) ($SrTiO_3$)-based material, a barium strontium titanate (BST) ($BaSrTiO_3$)-based material, and a PZT ($PbZrTiO_3$)-based material.

12. The thin film capacitor of claim 8, further comprising first and second vias electrically connected to the first and second electrode layers, respectively.

13. The thin film capacitor of claim 12, further comprising first and second electrode pads electrically connected to the first and second vias, respectively.

14. The thin film capacitor of claim 8, further comprising a protection layer covering the body.

* * * * *